US010776191B2

(12) United States Patent
Zheng et al.

(10) Patent No.: US 10,776,191 B2
(45) Date of Patent: Sep. 15, 2020

(54) ANOMALY DETECTION IN A SENSOR NETWORK

(71) Applicant: International Business Machines Corporation, Armonk, NY (US)

(72) Inventors: Yu Ling Zheng, Beijing (CN); Xiao Xing Liang, Beijing (CN); Yu Chen Zhou, Beijing (CN); Ning Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 15/828,105

(22) Filed: Nov. 30, 2017

(65) Prior Publication Data

US 2019/0163555 A1    May 30, 2019

(51) Int. Cl.
*G06F 11/07* (2006.01)
*G06F 17/18* (2006.01)
*G06F 17/14* (2006.01)
*G06K 9/00* (2006.01)
*G06F 17/10* (2006.01)

(52) U.S. Cl.
CPC .......... *G06F 11/0754* (2013.01); *G06F 17/10* (2013.01); *G06F 17/141* (2013.01); *G06F 17/18* (2013.01); *G06K 9/00* (2013.01); *G06K 9/0053* (2013.01)

(58) Field of Classification Search
CPC ....... G06F 11/0754; G06F 17/18; G06K 9/00; G06K 9/0053
See application file for complete search history.

(56) References Cited

U.S. PATENT DOCUMENTS

2007/0078589 A1    4/2007   Magnaghi et al.
2007/0208841 A1*   9/2007   Barone ............... B61L 15/0027
                                                          709/223
2010/0299118 A1   11/2010   Sharma et al.

FOREIGN PATENT DOCUMENTS

WO    2012103400 A1    8/2012
WO    2016195985 A1   12/2016
WO    2017001522 A1    1/2017

OTHER PUBLICATIONS

Fei Guo et al., Detecting Vehicle Anomaly in the Edge via Sensor Consistency and Frequency Characteristic, Jun. 2019, IEEE Transactions on Vehicular Technology, vol. 68, No. 6, pp. 5618-5628.*
Sandryhaila etal., Discrete Signal Processing on Graphs: Graph Fourier Transform, 2013, Acoustics, Speech, and Signal Processing, 1988. ICASSP-88., 1988 International Conference on. 6167-6170. 10.1109/ICASS.2013.6638850.*

(Continued)

*Primary Examiner* — Mischita L Henson
(74) *Attorney, Agent, or Firm* — Patterson + Sheridan, LLP

(57) ABSTRACT

A method, system, and computer product for anomaly detection in a sensor network. The method comprises: receiving measurements from a plurality of sensors in the sensor network. The method further comprises performing a graph Fourier transform on the measurements to obtain a spectrum. The graph Fourier transform is defined by a graph structure generated from the plurality of sensors. The method further comprises generating an anomaly alert in response to high frequency components of the spectrum exceeding a first threshold.

20 Claims, 5 Drawing Sheets

(56) References Cited

OTHER PUBLICATIONS

Antonio Marques et al., Stationary Graph Processes and Spectral Estimation, Aug. 5, 2017, IEEE, https://arxiv.org/pdf/1603.04667, pp. 1-16.*

Sheng Chen, Data Science with Graphs: A Signal Processing Perspective, 2016, Dissertations. 724. http://repository.cmu.edu/dissertaions/724, pp. 1-42.*

Hilmi E. Egilmez and Antonio Ortega, "Spectral Anomaly Detection Using Graph-Based Filtering for Wireless Sensor Networks," 2014.

James Sharpnack; Alessandro Rinaldo; Aarti Singh, Detecting Anomalous Activity on Networks With the Graph Fourier Scan Statistic*, Sep. 23, 2014.

Akoglu, L., Tong, H., & Koutra, D. (2015). Graph based anomaly detection and description: a survey. Data Mining and Knowledge Discovery, 29(3), 626-688.

Candes, E. J., Wakin, M. B., & Boyd, S. P. (2008). Enhancing sparsity by reweighted 1 minimization. Journal of Fourie analysis and applications, 14(5-6), 877-905.

* cited by examiner

ANOMALY DETECTION IN A SENSOR NETWORK

BACKGROUND

1. Field of the Invention

The present invention relates to anomaly detection, and more specifically, to a method, a system and a computer program product for anomaly detection in a sensor network.

2. Related Art

The Internet of Things (IoT) has gotten more and more attention with the development of society and economy. Networks of data-gathering sensors are commonly used in the Internet of Things to monitor assets or environment. In the Internet of Things, anomaly in measurements of sensors may occur due to sensor failure, abnormal changes of the monitored assets or environments and etc. Anomaly detection is an important issue in Internet of Things applications.

The data measured by the sensors in the Internet of Things can usually be considered as graph-structured data. The graph structure is defined according to the sensors in a sensor network based on a rule. It has proposed a method that detects a minor change of the graph structure for anomaly. However, the number of connected sensors is showing a fast growth. As it is reported, the installed base of IoT endpoints will grow from 9.7 billion in 2014 to more than 25.6 billion in 2019, hitting 30 billion in 2020. Therefore, it needs a faster method to process large volume of data to detect anomaly.

SUMMARY

In this disclosure, it is proposed a method, a system and a computer program product for anomaly detection in a sensor network.

According to one embodiment of the present disclosure, there is provided a computer-implemented method for anomaly detection in a sensor network. The method includes receiving measurements from a plurality of sensors in the sensor network. The method further includes performing a graph Fourier transform on the measurements to obtain a spectrum. The graph Fourier transform is defined by a graph structure generated from the plurality of sensors. The method further includes generating an anomaly alert in response to high frequency components of the spectrum exceeding a first threshold.

According to another embodiment of the present disclosure, there is provided a system for anomaly detection in a sensor network. The system includes one or more processors and a memory coupled to at least one of the one or more processors. The system includes a set of computer program instructions stored in the memory and executed by at least one of the one or more processors in order to perform action of receiving measurements from a plurality of sensors in the sensor network. The system includes a set of computer program instructions stored in the memory and executed by at least one of the one or more processors in order to perform action of performing a graph Fourier transform on the measurements to obtain a spectrum. The graph Fourier transform is defined by a graph structure generated from the plurality of sensors. The system includes a set of computer program instructions stored in the memory and executed by at least one of the one or more processors in order to perform action of generating an anomaly alert in response to high frequency components of the spectrum exceeding a first threshold.

According to a further embodiment of the present disclosure, there is provided a computer program product for anomaly detection in a sensor network. The computer program product includes a computer readable storage medium having program instructions embodied therewith. The program instructions being executable by a device to cause the device to perform a method. The method includes receiving measurements from a plurality of sensors in the sensor network. The method further includes performing a graph Fourier transform on the measurements to obtain a spectrum. The graph Fourier transform is defined by a graph structure generated from the plurality of sensors. The method further includes generating an anomaly alert in response to high frequency components of the spectrum exceeding a first threshold.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same component(s) in the embodiments of the present disclosure.

DETAILED DESCRIPTION

Figure 1:
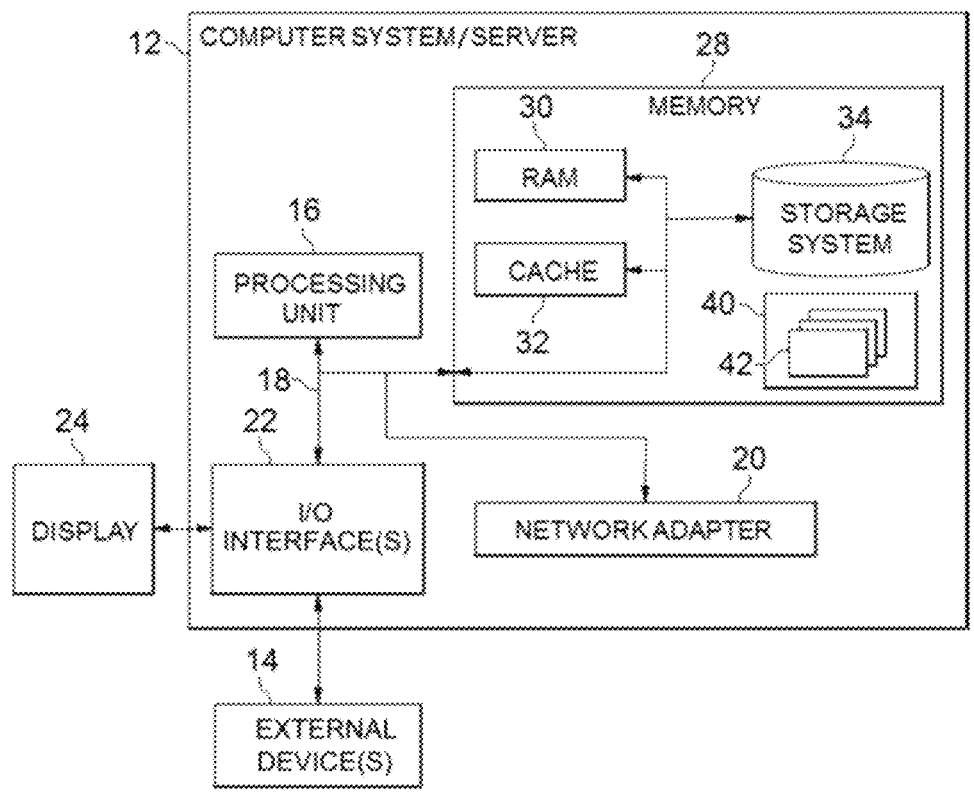
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
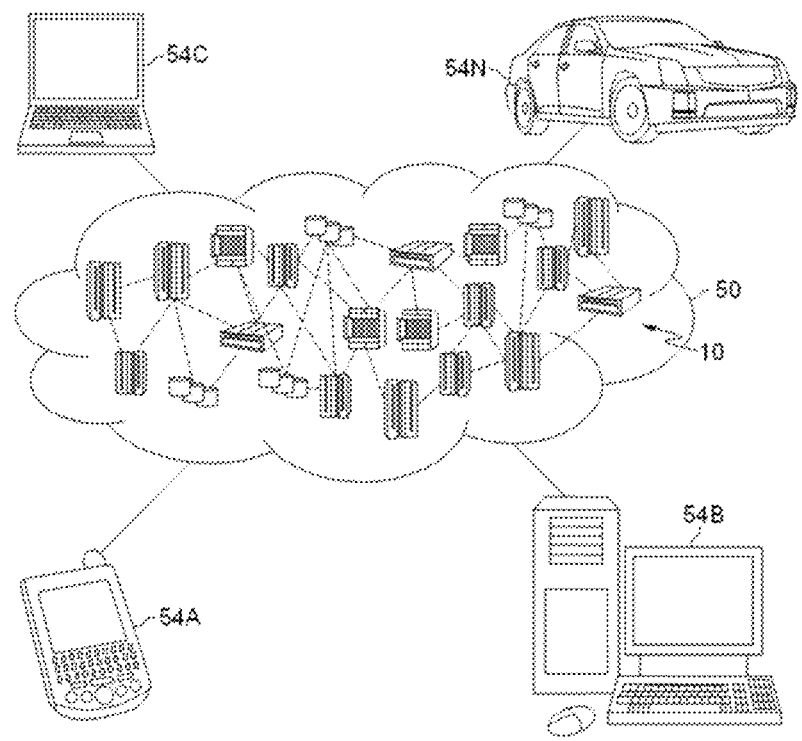
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
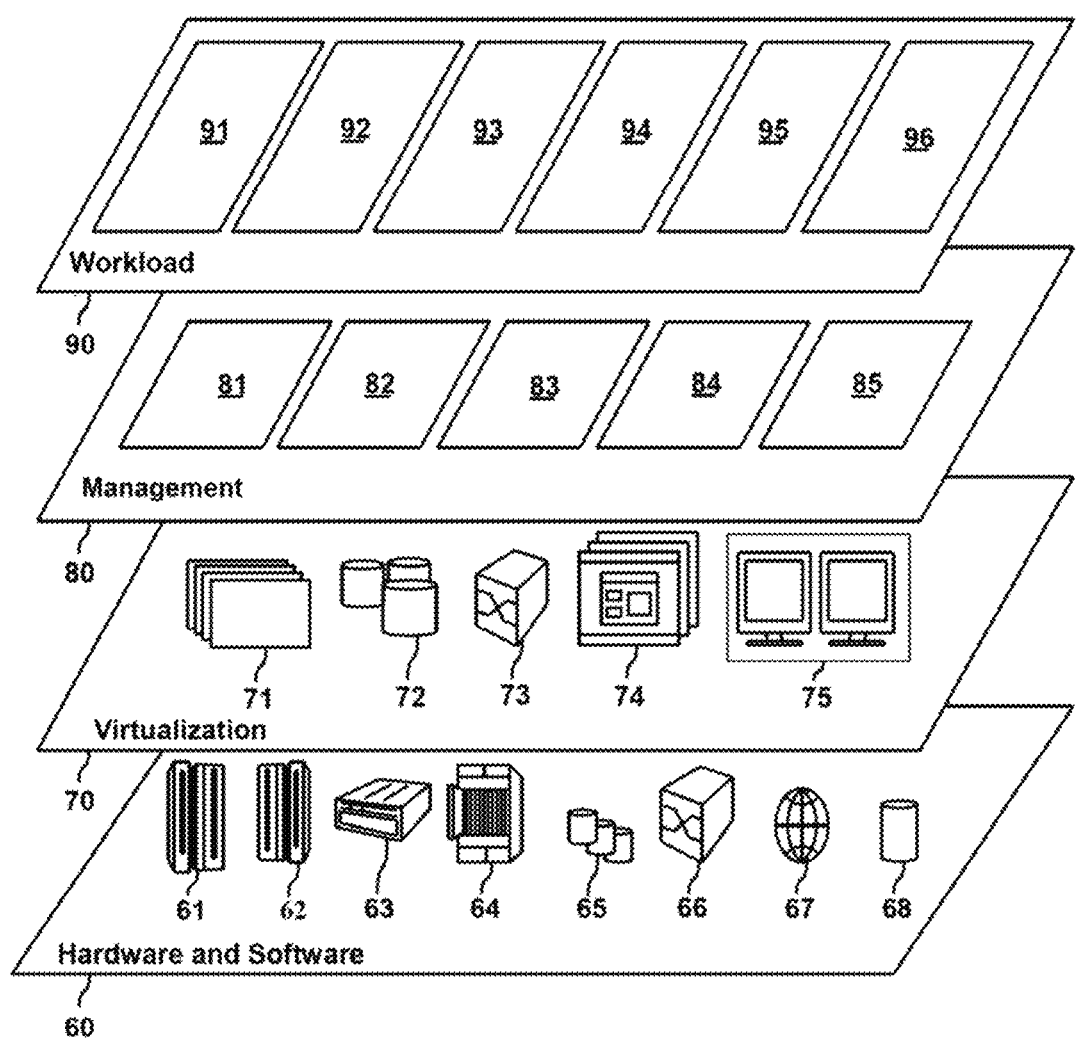
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Due to the large volume of data generated by the sensors in the IoT, it is hard to process the data fast. On the other hand, more and more applications need a real time response for anomaly detection. The inventors of the present disclosure found a way to detect anomaly in a sensor network in real time even if volume of data is large. Further, besides the anomaly detection, an aspect of the invention can achieve anomaly localization, that is, it is able to determine which sensor(s) the anomaly occurs at.

Figure 6:
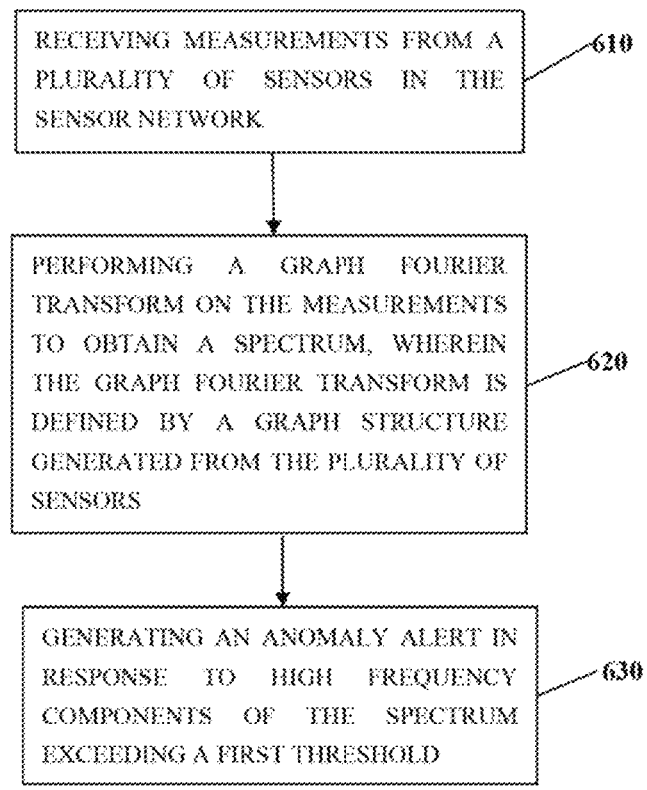
FIG. 6 is a flowchart depicting a computer-implemented method for anomaly detection in a sensor network according to an embodiment of the present disclosure.

With reference now to FIG. 6, FIG. 6 is a flowchart illustrating a computer-implemented method for anomaly detection in a sensor network according to an embodiment of the present disclosure. As shown in FIG. 6, the computer-implemented method for anomaly detection in the sensor network includes a measurement receiving step 610, a graph Fourier transform step 620, and an anomaly alerting step 630. In one embodiment of the invention, the computer-implemented method in FIG. 6 is performed in a computer system/server 12 in the cloud computing node 10. In one embodiment of the invention, the computer-implemented method in FIG. 6 is performed in real time.

Figure 4A:
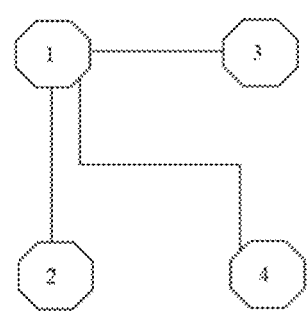
FIG. 4A depicts an example of a sensor network in a water pipe network according to one embodiment of the present disclosure.
Figure 5A:
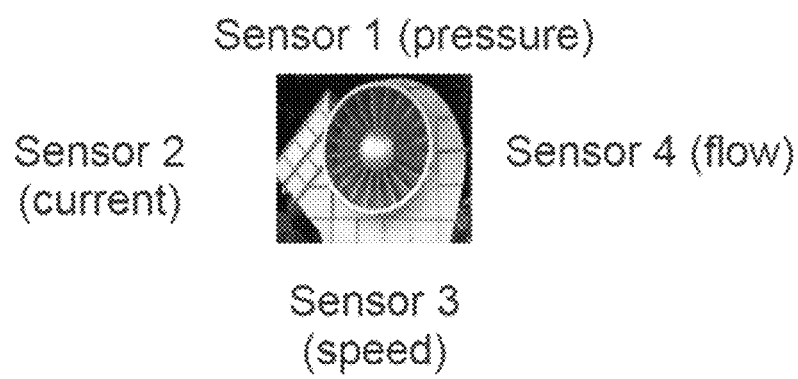
FIG. 5A depicts another example of a sensor network in an air outlet according to one embodiment of the present disclosure.

Specifically, in the measurement receiving step 610, measurements from a plurality of sensors in the sensor network is received. The sensor network here is a local network in the IoT. In the IoT, there are a variety of sensor networks. FIG. 4A shows an example of a sensor network in a water pipe network according to one embodiment of the invention. In FIG. 4A, an octagon represents a pump, for example, and there are four pressure sensors 1 to 4 located in the pumps 1 to 4, respectively. Since all of the four pressure sensors are used to measure or monitor the same physical quantity (i.e., pressure), they are called homogeneous sensors. FIG. 5A shows another example of a sensor network in an air outlet according to one embodiment of the invention. In FIG. 5A, a ventilating fan is installed in the air outlet and there are four sensors 1 to 4 located around the fan to monitor different physical quantities. For example, in FIG. 5A, the sensor 1 is used to measure air pressure of air flow going through the fan; the sensor 2 is used to measure current of electric motor of the fan; the sensor 3 is used to measure rotation speed of the fan; and the sensor 4 is used to measure speed of air flow. Since all of the four sensors in FIG. 5A are used to monitor or measure different physical quantities, they are called heterogeneous sensors.

The sensor networks in FIGS. 4A and 5A will be used as examples to describe the computer-implemented method in FIG. 6. For example, in the step 610, measurements of sensors 1 to 4 in FIG. 4A are received as $[m_1, m_2, m_3, m_4]^T$, wherein $m_1$ to $m_4$ are measurements of sensors 1 to 4 in FIG. 4A. Or, in another example, in the step 610, measurements of sensors 1 to 4 in FIG. 5A are received as $[n_1, n_2, n_3, n_4]^T$, wherein $n_1$ to $n_4$ are measurements of sensors 1 to 4 in FIG. 5A.

Referring back to FIG. 6, in the graph Fourier transform step 620, a graph Fourier transform is performed on the measurements to obtain a spectrum. The graph Fourier transform may be defined by a graph structure generated from the plurality of sensors. That is, the graph structure that is based on the plurality of sensors in the sensor network is introduced in the graph Fourier transform. According to an embodiment of the invention, the graph Fourier transform can be defined as:

$$S = F \cdot V \quad (1)$$

In the equation (1), V is a vector of measurements of sensors, S is the outcome of the transform, and F is a graph Fourier transform matrix which derives from a certain representation of the graph structure of the sensors. In the example of FIG. 4A, $V=[m_1, m_2, m_3, m_4]^T$, and in the example of FIG. 5A, $V=[n_1, n_2, n_3, n_4]^T$.

According to an embodiment of the invention, the graph structure is generated from the sensor network offline, and is then used in the method in FIG. 6 for online anomaly detection. FIGS. 4A to 5B are used as examples to describe how to generate a graph structure from a sensor network.

Figure 4B:
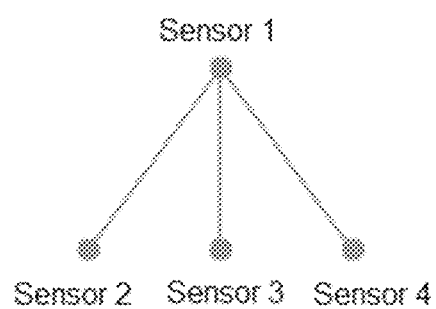
FIG. 4B depicts a graph structure corresponding to the sensor network in FIG. 4A.

In the example of FIG. 4A, the plurality of sensors are homogeneous sensors, and the graph structure may be generated from topology of the plurality of sensors in the sensor network. According to one embodiment of the invention, the following rules may be followed to generate the graph structure of the sensor network: a pressure sensor at each pump corresponds to a node of the graph; and an edge is present in the graph if a pipe exists between two pumps. According to these rules, a graph is obtained from FIG. 4A and shown as in FIG. 4B. In FIG. 4B, sensors 1 to 4 are nodes in the graph, and there are edges between sensor 1 and sensors 2 to 4. The graph structure in FIG. 4B can be expressed as an adjacency matrix as follows.

$$A1 = \begin{bmatrix} 0 & 1 & 1 & 1 \\ 1 & 0 & 0 & 0 \\ 1 & 0 & 0 & 0 \\ 1 & 0 & 0 & 0 \end{bmatrix}$$

In the adjacency matrix A1, elements in the first row show relationships of sensor 1 with other sensors. For example, the first element 1 in the first row means there is an edge exists between sensor 1 and sensor 2 in the graph, the second element 1 in the first row means there is an edge exists between sensor 1 and sensor 3 in the graph, and so on. Further, elements in the second row show relationships of sensor 2 with other sensors, and so on. Elements in the diagonal of the matrix are zeros, since they represent relationships of sensors and themselves. Thus, the adjacency matrix A1 may reflect the graph structure of the sensor network in FIG. 4B.

In the example of FIG. 5A, the plurality of sensors are heterogeneous sensors, and the graph structure may be generated based on historical data of the plurality of sensors by data mining. For example, for the four sensors 1 to 4 in FIG. 5A, they correspond to four nodes in the graph. However, since they are heterogeneous sensors, the graph structure is learned from historical data of the four sensors 1 to 4 in FIG. 5. One example of the data mining method used here is graphical lasso (G-lasso), and another example of the data mining method is latent variable Gaussian graphical model (LV-GGM). Although the above two data mining method are exemplified, other data mining methods or machine learning methods can be used here as long as correlations or partial correlations between different sensors can be learned.

In the example of FIG. 5A, by using G-lasso or LV-GGM, for example, the following correlation matrix is obtained:

$$R = \begin{bmatrix} 0 & 0.7 & 0.4 & 0.01 \\ 0.7 & 0 & 0.3 & 0.01 \\ 0.4 & 0.3 & 0 & 0.2 \\ 0.01 & 0.01 & 0.2 & 0 \end{bmatrix}$$

In the correlation matrix R, elements represent correlations or partial correlations between different sensors. For example, element 0.7 represents correlation between sensor 1 and sensor 2 in FIG. 5A, element 0.3 represents correlation between sensor 2 and sensor 3 in FIG. 5A, and so on.

Figure 5B:
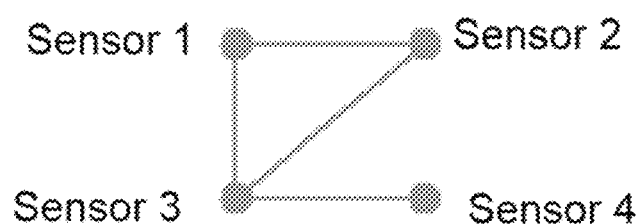
FIG. 5B depicts a graph structure corresponding to the sensor network in FIG. 5A.

According to one embodiment of the invention, it may specifies that: an edge exists between two nodes (sensors) if the correlation between the two nodes exceeds a threshold. For example, in this example, the threshold may be 0.02. That is, if an element in the matrix R is greater than 0.02, an edge corresponding to the element is deemed as existing. According to this rule, a graph is obtained from the matrix R and shown as in FIG. 5B. In FIG. 5B, sensors 1 to 4 are nodes in the graph, and there are edges between sensor 3 and sensors 1, 2 and 4 and an edge between sensor 1 and sensor 2. The graph structure in FIG. 5B can be expressed as an adjacency matrix as follows.

$$A2 = \begin{bmatrix} 0 & 1 & 1 & 0 \\ 1 & 0 & 1 & 0 \\ 1 & 1 & 0 & 1 \\ 0 & 0 & 1 & 0 \end{bmatrix}$$

In the adjacency matrix A2, elements in the first row show relationships of sensor 1 with other sensors. For example, the first element 1 in the first row means there is an edge exists between sensor 1 and sensor 2 in the graph, the second element 1 in the first row means there is an edge exists between sensor 1 and sensor 3 in the graph, and so on. Further, elements in the second row show relationships of sensor 2 with other sensors, and so on. Elements in the diagonal of the matrix are zeros, since they represent relationships of sensors and themselves. Thus, the adjacency matrix A2 may reflect the graph structure of the sensor network in FIG. 5B.

In one embodiment of the invention, an adjacency matrix of the graph structure is used to define the graph Fourier transform. That is, the adjacency matrix of the graph structure is used to define F term in equation (1). In one embodiment of the invention, F may be defined by the adjacency matrix directly. For example, in the above example in FIG. 4B, F may be equal to A1, or F maybe a matrix that derives from A1. For example, in the above example in FIG. 5B, F may be equal to A2, or F may be a matrix that derives from A2.

In another embodiment of the invention, F may be defined by the adjacency matrix indirectly, for example, by a Laplacian matrix. In such a case, the graph Fourier transform may be defined by eigenvectors of the Laplacian matrix. To do so, the Laplacian matrix is firstly computed by $$L = D - A \qquad (2)$$

In the equation (2), L is a Laplacian matrix, A is an adjacency matrix, and D is a degree matrix of the adjacency matrix A.

Taking the graph in FIG. 4B as an example, in this case, A=A1, and $$D = \begin{bmatrix} 3 & 0 & 0 & 0 \\ 0 & 1 & 0 & 0 \\ 0 & 0 & 1 & 0 \\ 0 & 0 & 0 & 1 \end{bmatrix}$$

thus, $$L = D - A1 = \begin{bmatrix} 3 & -1 & -1 & -1 \\ -1 & 1 & 0 & 0 \\ -1 & 0 & 1 & 0 \\ -1 & 0 & 0 & 1 \end{bmatrix}$$

With the Laplacian matrix L, an eigendecomposition (also called spectral decomposition) is performed by $$L = QVQ^{-1} \qquad (3)$$

In the equation (3), Q is an orthogonal matrix, and V is a diagonal matrix. In this embodiment, the matrix Q that includes eigenvectors is used to define F in the equation (1). In one embodiment of the invention, $F=Q^{-1}$. In another embodiment of the invention, F may be a matrix that derives from $Q^{-1}$. This kind of definition of F can also be applied to the example in FIG. 5B similarly, and details are not repeated here.

In another embodiment of the invention, the adjacency matrix may not be filled with 0s or 1s, and it may have elements weighted according to the data mining based on the historical data. For example, in the example in FIG. 5B, the correlation matrix R may be used as the adjacency matrix with elements smaller than a threshold being set to zero, and the correlation in matrix R is used as weight in the adjacency matrix.

$$A3 = \begin{bmatrix} 0 & 0.7 & 0.4 & 0 \\ 0.7 & 0 & 0.3 & 0 \\ 0.4 & 0.3 & 0 & 0.2 \\ 0 & 0 & 0.2 & 0 \end{bmatrix}$$

For example, the adjacency matrix A3 is obtained by setting elements in matrix R that are smaller than 0.02 to zero. In the adjacency matrix A3, elements in the first row show relationships of sensor 1 with other sensors. Elements greater than zero represents an edge exists. For example, the element 0.7 in the first row means there is an edge exists between sensor 1 and sensor 2 in the graph, the element 0.4 in the first row means there is an edge exists between sensor 1 and sensor 3 in the graph, and so on. Further, elements in the second row show relationships of sensor 2 with other sensors, and so on. Elements in the diagonal of the matrix are zeros, since they represent relationships of sensors and themselves. Thus, the adjacency matrix A3 may also reflect the graph structure of the sensor network in FIG. 5B and can be used to replace the adjacency matrix A2. This embodiment can be combined with the above embodiments to define the graph Fourier transform.

Figure 7:
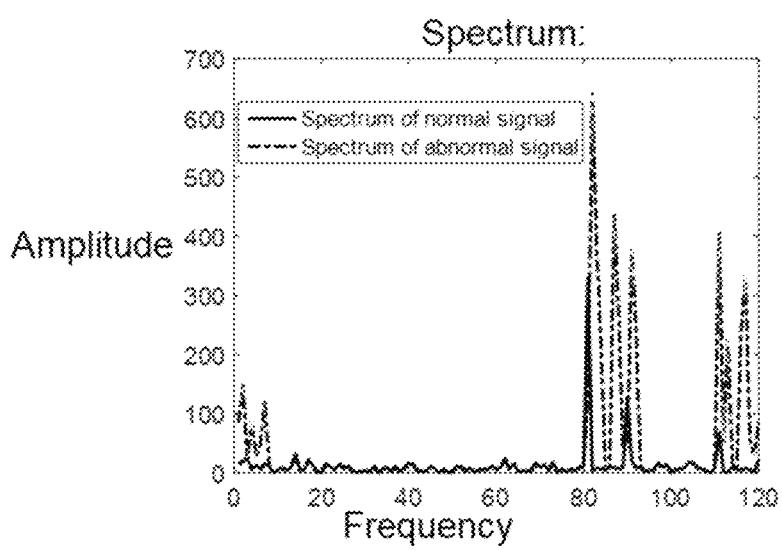
FIG. 7 depicts an example of a spectrum obtained after the graph Fourier transform.

By performing the graph Fourier transform on the measurements from the plurality of sensors in the sensor network, a spectrum is obtained. FIG. 7 shows an example of a spectrum obtained after the graph Fourier transform. In FIG. 7, the horizontal axis represents frequency, and the vertical axis represents amplitude.

Referring back to FIG. 6, in the anomaly alerting step 630, an anomaly alert is generated in response to high frequency components of the spectrum exceed a first threshold. In FIG. 7, the solid curve shows spectrum of a normal signal (measurement), and the dashed curve shows spectrum of an abnormal signal (anomaly). The high frequency components of the spectrum signal obtained after the graph Fourier transform can reflect anomaly occurring in the sensor network. Thus, by letting the spectrum signal go through a high-pass filter, high frequency components of the spectrum signal are obtained. Then, in one embodiment of the invention, energy of the high frequency components is compared with a first threshold, which is set according to experiences. If the energy of high frequency components is greater than the first threshold, an anomaly alert is generated. In another embodiment of the invention, peak of the high frequency components is compared with a first threshold. If the peak of the high frequency components is greater than the first threshold, an anomaly alert is generated.

The above embodiments has a low computational cost and can scale well. The graph Fourier transform is low computational demanding, and its computational complexity is $O(N^\alpha)$ with $\alpha \leq 2$. According to an aspect of the invention, to perform the anomaly detection in a sensor network, only the graph Fourier transform is needed to be performed so that a real time monitoring can be achieved with a low computational cost.

As described above, besides the anomaly detection, an aspect of the invention can achieve anomaly localization, that is, it is able to determine where the anomaly occurs. The anomaly localization is done only if an anomaly in the sensor network is detected. Thus, the computation involved in the anomaly localization is not performed all the time and the computation intensity is relatively low. To perform the anomaly localization, the computer-implemented method in FIG. 6 may further include: in response to high frequency components of the spectrum exceeding a first threshold, estimating normal output values of sensors using a sparsity based signal reconstruction method.

Specifically, in one embodiment of the invention, a model is created as:

$$x+n=y \tag{4}$$

In the equation (4), x is a vector and represents normal values of sensors, n is a vector and represents errors, and y is a vector and represents measurements of sensors. In an aspect of the invention, it is assumed that only measurements of abnormal sensors have large errors. That is, it is assumed that n should be sparse. Additionally, it is a fact that the normal values of x should be smooth with respect to the defined graph. Based on the above founding, the inventors of the invention provide the following equation (5) to estimate normal output values of sensors using a sparsity based signal reconstruction method. In one embodiment of the invention, the sparsity based signal reconstruction method may include one of $L_1$ norm based method or $L_p$ ($0 \leq p < 1$) norm based method.

$$\hat{x} = \mathrm{argmin}_x \{\|y-x\|_1 + \lambda x^T L x\} \tag{5}$$

In the equation (5), $\hat{x}$ is estimated normal output values of sensors, $\lambda$ is a regularization parameter, L is the Laplacian matrix of the graph. In the equation (5), $L_1$ norm is used. The sparsity is introduced in the term using $L_1$ norm. In another embodiment of the invention, $L_p$ ($0 \leq p < 1$) norm may be used here. That is, the term $\|y-x\|_1$ in equation (5) can be replaced by $\|y-x\|_p$.

Figure 8A:
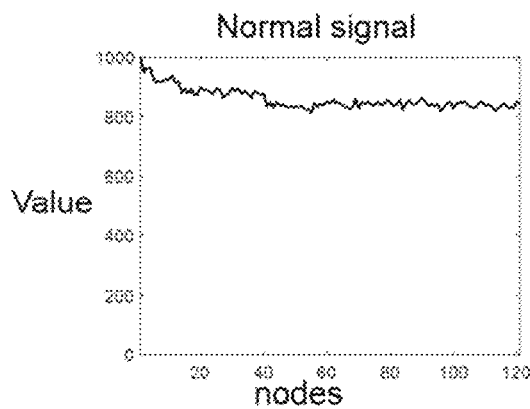
FIG. 8A depicts a curve diagram that shows normal output values of sensors in a sensor network if an anomaly does not occur.
Figure 8B:
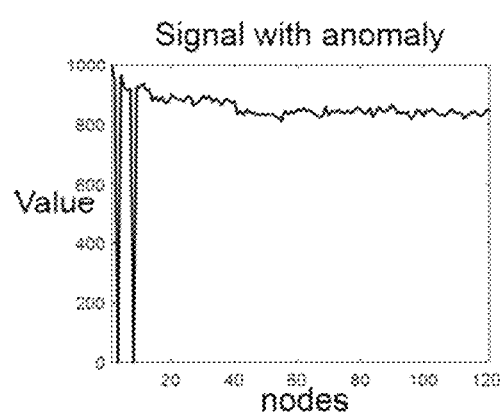
FIG. 8B depicts a curve diagram that shows measurements of the sensors in the sensor network when anomaly occurs.

FIG. 8A depicts a curve diagram that shows normal output values of sensors in a sensor network if an anomaly does not occur. In FIGS. 8A to 8D, the horizontal axis represents serial numbers of sensors (nodes), and the vertical axis represents values of normal, measured or estimated signal. In FIGS. 8A to 8D, the curves are formed based on discrete values at nodes. FIG. 8B depicts a curve diagram that shows measurements of the sensors in the sensor network when anomaly occurs. It can be seen that, in FIG. 8B, the curve in the graph is not smooth and there are two measurements belonging to outliers. That is, FIG. 8A shows values of x, and FIG. 8B shows values of y.

Figure 8C:
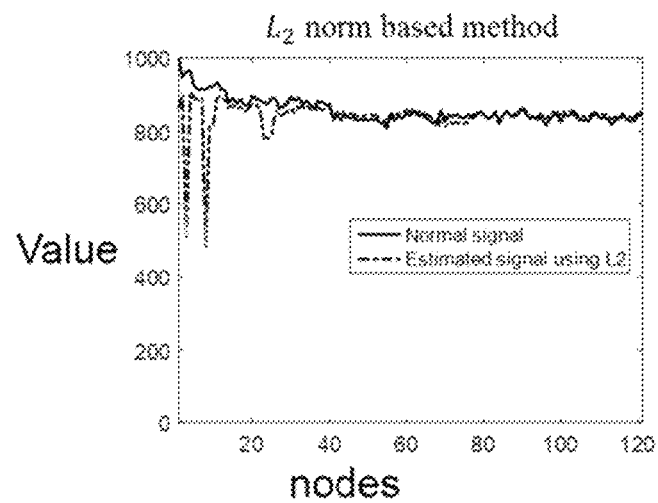
FIG. 8C depicts a curve diagram that shows comparison between normal output values and estimated values of sensors in the sensor network, in which the estimated values are obtained by using $L_2$ norm based method.
Figure 8D:
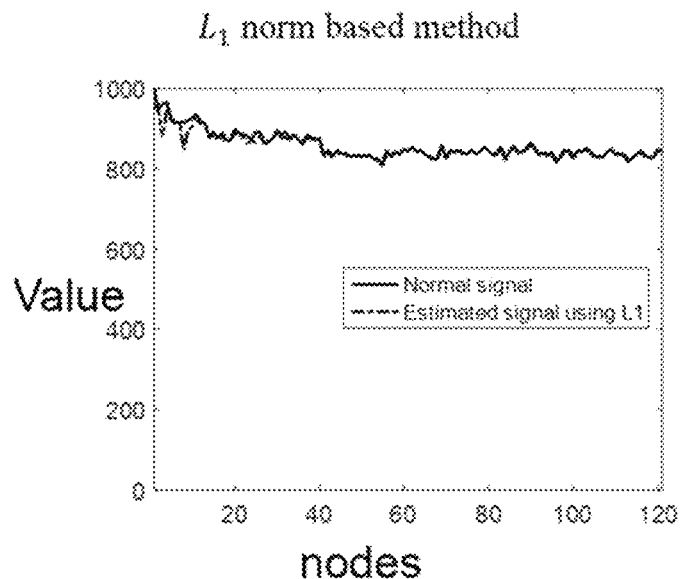
FIG. 8D depicts a curve diagram that shows comparison between normal output values and estimated values of sensors in the sensor network, in which the estimated values are obtained by using $L_1$ norm based method.

FIG. 8C depicts a curve diagram that shows comparison between normal output values and estimated values of sensors in the sensor network, in which the estimated values are obtained by using $L_2$ norm based method. FIG. 8D depicts a curve diagram that shows comparison between normal output values and estimated values of sensors in the sensor network, in which the estimated values are obtained by using $L_1$ norm based method. In FIGS. 8C and 8D, the solid curve shows normal output values of the sensors if an anomaly does not occur (i.e., values of x), and the dashed curve shows estimated values of the sensors (i.e., values of $\hat{x}$) based on the signal reconstruction method, for example, by using the equation (5). It can be seen that, the $L_1$ norm based method may produce a much more accurate estimation since the solid curve and the dashed curve are closer in FIG. 8D than in FIG. 8C.

To perform the anomaly localization, the computer-implemented method in FIG. 6 may further include: determining each of the sensors at which the anomaly occurs by comparing the difference between estimated value and measurement of each of the plurality of sensors and a second threshold. With the estimated values ($\hat{x}$) and the measurements (y) of the sensors, the sensors at which the anomaly occurs may be determined by using the following equation (6):

$$|\hat{x}-y|>t \tag{6}$$

Wherein t is the second threshold, which is set according to experiences, and $\hat{x}$ and y are vectors. For each sensor (node), if the difference between its estimated value and its measurement exceeds the second threshold, it is determined as a sensor where anomaly occurs. In the examples in FIGS. 8C and 8D, for example, by the comparison in the equation (6), it shows that the node with serial number 3 and the node with serial number 8 are the sensors where anomaly occurs. In this way, the anomaly localization is completed successfully.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for anomaly detection in a sensor network, the method comprising:
   receiving a plurality of measurements from a plurality of sensors in the sensor network, wherein the sensor network is a local internet of things network;
   generating a graph structure comprising relationships of the plurality of sensors;

performing, based on the graph structure, a graph Fourier transform on the plurality of measurements to obtain a spectrum;

analyzing the spectrum to detect a plurality of high frequency components;

generating an anomaly alert in response to one or more of the plurality of high frequency components exceeding a first threshold; and determining a location of the anomaly within the sensor network.

2. The method according to claim 1, wherein determining the location of the anomaly within the sensor network comprises, in response to the plurality of high frequency components exceeding the first threshold:

estimating a plurality of normal output values of the plurality of sensors using a sparsity based signal reconstruction method; and comparing, for each of the plurality of sensors, a difference between i) an estimated value of the estimated plurality of normal output values and a measurement of the plurality of measurements and ii) a second threshold.

3. The method according to claim 2, wherein the sparsity based signal reconstruction method includes one of i) an $L_1$ norm based method and ii) an $L_p(0{\leq}p{<}1)$ norm based method.

4. The method according to claim 1, wherein the plurality of sensors are homogeneous sensors, and wherein the graph structure is generated from a topology of the plurality of sensors in the sensor network.

5. The method according to claim 1, wherein the plurality of sensors are heterogeneous sensors, and wherein the graph structure is generated by data mining based on historical data of the plurality of sensors.

6. The method according to claim 5, wherein an adjacency matrix of the graph structure is used to define the graph Fourier transform, and wherein the adjacency matrix has a plurality of elements weighted according to the data mining based on the historical data.

7. The method according to claim 5, wherein the data mining includes one of i) a graphical lasso or ii) a latent variable Gaussian graphical model.

8. A system for anomaly detection in a sensor network, the system comprising:

one or more processors;

a memory coupled to at least one of the one or more processors;

a set of computer program instructions stored in the memory and executed by at least one of the one or more processors in order to perform actions of:

receiving a plurality of measurements from a plurality of sensors in the sensor network, wherein the sensor network is a local internet of things network;

generating a graph structure comprising relationships of the plurality of sensors;

performing, based on the graph structure, a graph Fourier transform on the plurality of measurements to obtain a spectrum;

analyzing the spectrum to detect a plurality of high frequency components;

generating an anomaly alert in response to one or more of the plurality of high frequency components exceeding a first threshold; and determining a location of the anomaly within the sensor network.

9. The system according to claim 8, wherein determining the location of the anomaly within the sensor network comprises, in response to the plurality of high frequency components exceeding the first threshold:

estimating a plurality of normal output values of the plurality of sensors using a sparsity based signal reconstruction method; and comparing, for each of the plurality of sensors, a difference between i) an estimated value of the estimated plurality of normal output values and a measurement of the plurality of measurements and ii) a second threshold.

10. The system according to claim 9, wherein the sparsity based signal reconstruction method includes one of i) an $L_1$ norm based method and ii) an $L_p(0{\leq}p{<}1)$ norm based method.

11. The system according to claim 8, wherein the plurality of sensors are homogeneous sensors, and wherein the graph structure is generated from a topology of the plurality of sensors in the sensor network.

12. The system according to claim 8, wherein the plurality of sensors are heterogeneous sensors, and wherein the graph structure is generated by data mining based on historical data of the plurality of sensors.

13. The system according to claim 12, wherein an adjacency matrix of the graph structure is used to define the graph Fourier transform, and wherein the adjacency matrix has a plurality of elements weighted according to the data mining based on the historical data.

14. The system according to claim 12, wherein the data mining includes one of i) a graphical lasso and ii) latent variable Gaussian graphical model.

15. A computer program product for anomaly detection in a sensor network, the computer program product comprising a computer readable storage medium having program instructions embodied therewith, wherein the program instructions being executable by a device to cause the device to perform a method comprising:

receiving a plurality of measurements from a plurality of sensors in the sensor network, wherein the sensor network is a local internet of things network;

generating a graph structure comprising relationships of the plurality of sensors;

performing, based on the graph structure, a graph Fourier transform on the plurality of measurements to obtain a spectrum;

analyzing the spectrum to detect a plurality of high frequency components;

generating an anomaly alert in response to one or more of the plurality of high frequency components exceeding a first threshold; and determining a location of the anomaly within the sensor network.

16. The computer program product according to claim 15, wherein determining the location of the anomaly within the sensor network comprises, in response to the plurality of high frequency components exceeding the first threshold:

estimating a plurality of normal output values of the plurality of sensors using a sparsity based signal reconstruction method; and comparing, for each of the plurality of sensors, a difference between i) an estimated value of the estimated plurality of normal output values and a measurement of the plurality of measurements and ii) a second threshold.

17. The computer program product according to claim 16, wherein the sparsity based signal reconstruction method includes one of i) a $L_1$ norm based method and ii) a $L_p(0{\leq}p{<}1)$ norm based method.

18. The computer program product according to claim 15, wherein the plurality of sensors are homogeneous sensors, and wherein the graph structure is generated from a topology of the plurality of sensors in the sensor network.

19. The computer program product according to claim 15, wherein the plurality of sensors are heterogeneous sensors, and wherein the graph structure is generated by data mining based on historical data of the plurality of sensors.

20. The computer program product according to claim 19, wherein an adjacency matrix of the graph structure is used to define the graph Fourier transform, and wherein the adjacency matrix has a plurality of elements weighted according to the data mining based on the historical data.

\* \* \* \* \*